Patented Aug. 14, 1945

2,382,285

UNITED STATES PATENT OFFICE 2,382,285

MANUFACTURE OF ARYLACETONITRILE DERIVATIVES

Franz Bergel, Nathan Chadwick Hindley, Alexander Lang Morrison, and Heinrich Rinderknecht, Welwyn Garden City, England, assignors to Roche Products Limited, Welwyn Garden City, England No Drawing. Application October 15, 1942, Serial No. 462,157. In Great Britain November 19, 1941

4 Claims. (Cl. 260—465)

In our co-pending application, Ser No. 433,340, filed March 4, 1942, a process is described for the manufacture of arylacetonitrile derivatives and cyclic bases derived therefrom. The synthesis involves the preparation of an α:α-bis-(β'-vinyloxyethyl)-arylacetonitrile by condensing an arylacetonitrile containing a reactive methylene group with a β-halogen-alkylvinyl ether in the presence of alkaline condensing agents, such as sodamide, from which the α:α-bis-(β'-hydroxyalkyl)-arylacetonitrile is obtained by mild acid hydrolysis.

It is an object of the present invention to manufacture α:α-bis-(β'-hydroxyalkyl)-arylacetonitriles of the general formula

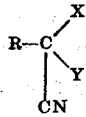

where R is an aryl group, which may carry substituents not interfering with the reaction, and X and Y are β-hydroxyalkyl groups.

The process of the present invention comprises condensing an arylacetonitrile possessing a reactive methylene group, such as benzyl cyanide, in the presence of an alkaline condensing reagent, capable of forming an alkali derivative of the arylacetonitrile such as sodamide, with slightly more than two molecular proportions of a formal of the following general formula:

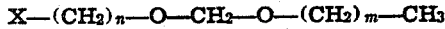

where X is a halogen, n is two and m is zero or an integer and subjecting the condensation product to mild hydrolysis under acid conditions.

Formals of this type can be prepared by reacting ω-halogen-alkyl-chloromethyl ethers with alcohols or their sodium derivatives as described by Henry (Ber., 1893, 26, ref. 933; 1895, 28, ref. 857). We have prepared, in a specially advantageous manner, β-chloro-ethylalkylformals from ethylene oxide and chloromethylalkyl ethers essentially according to the method used for the preparation of β,β-dichloroisopropyl alkyl formals. (cf. Blanchard Bull., 1926, (4) 39, 1263). The condensation product of the arylacetonitrile with the said formals, which has the general formula:

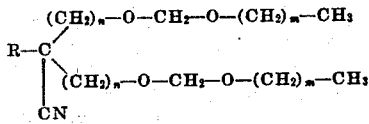

where R is an aryl group, n is two and m is zero or an integer, on mild hydrolysis with an acid reagent yields the corresponding α:α-bis-(β'-hydroxyalkyl)-arylacetonitrile, two molecules of formaldehyde and two molecules of alcohol $CH_3(CH_2)_mOH$. Replacement of the hydroxyl groups of the said compounds by halogen groups and condensing the resulting α:α-bis-(β'-halogenalkyl)-arylacetonitriles with primary amines will give bases such as 4-aryl-piperidine-4-nitrile as described in our co-pending application Ser. No. 433,340, filed March 4, 1942.

The following example illustrates how the process of the present invention may be carried into effect.

To 22 parts by weight of dry liquid ethylene oxide, 40 parts by weight of chloromethyl ether are added drop by drop with shaking at —5 to —10° C. The temperature of the mixture is then allowed to rise gradually to 25° C. After twelve hours' standing at this temperature the mixture is washed with dilute sodium carbonate solution and dried over anhydrous potassium carbonate. In subsequent fractional distillation the fraction boiling at 135–138° C. is collected, which is the β-chloroethylmethylformal.

To a mixture of 11.7 parts by weight of benzyl cyanide and 27 parts by weight of the β-chloroethylmethylformal and 120 parts by volume of dry toluene, 7.8 parts by weight of powdered sodamide are added in several portions. The reaction mixture is stirred mechanically and the temperature kept at 30–50° C. When the addition of sodamide has been completed, the reaction mixture is slowly heated to the boiling point and refluxing continued for 1½ hours. After cooling water is added and the toluene layer is separated. The toluene solution is washed with water and evaporated. The residue is distilled in high vacuo, when α:α-bis-(β'-(methoxy-methyleneoxy)-ethyl)-phenylacetonitrile comes over at 155–160° C./0.2 mm. as a yellow viscous oil.

A suspension of five parts by weight of α:α-bis-(β'-(methoxy-methoxyleneoxy)-ethyl)-phenylacetonitrile in 100 parts by weight of water is heated to 90° C. Two parts by weight of concentrated hydrochloric acid are then added with vigorous mechanical stirring. After 25 minutes stirring at 90° C. the mixture is cooled and extracted several times with ethyl acetate. The extract may be evaporated and the residue distilled in high vacuo, when α:α-bis-(β'-hydroxyethyl)-phenylacetonitrile comes over at 190–192° C./0.2 mm., or it may be concentrated and cooled, whereupon the said compound precipitates in crystalline form having a melting point of 96–98° C.

We claim:
1. A process for the manufacture of α:α-bis-(β'-hydroxy-ethyl)-phenylacetonitrile which comprises condensing benzyl cyanide with β-chloroethylmethylformal in the presence of sodamide and subjecting the α-α-bis-(β'-(methoxymethyleneoxy)-ethyl)-phenylacetonitrile thus formed to hydrolysis with hydrochloric acid to form α-α-bis (β'-hydroxy-ethyl)-phenylacetonitrile.

2. A process for the manufacture of α:α-bis-(β'-hydroxyalkyl)-arylacetonitriles of the general formula

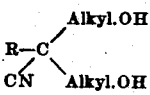

wherein R is an aryl group, which process comprises condensing an arylacetonitrile with slightly more than two molecular proportions of a formal of the general formula

wherein X is halogen and m is selected from the group consisting of zero and integers, in the presence of an alkaline condensing agent selected from the group consisting of alkaline agents consisting of alkali metal compounds capable of reacting with active methylene group to produce alkali metal substitution, and subjecting the condensation product to mild hydrolysis under acid conditions.

3. A process for the manufacture of α:α-bis-(β'-hydroxyalkyl)-phenylacetonitriles of the general formula

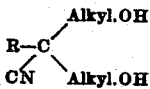

wherein R is an aryl group, which process comprises condensing a benzyl cyanide with slightly more than two molecular proportions of a formal of the general formula

wherein X is halogen and m is selected from the group consisting of zero and integers, in the presence of an alkaline condensing agent selected from the group consisting of alkaline agents consisting of alkali metal compounds capable of reacting with active methylene groups to produce alkali metal substitution, and subjecting the condensation product to mild hydrolysis under acid conditions.

4. A process for the manufacture of α:α-bis-(β-hydroxyalkyl)-arylacetonitriles of the general formula

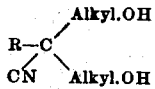

wherein R is an aryl group, which process comprises condensing an arylacetonitrile with slightly more than two molecular proportions of a formal of the general formula

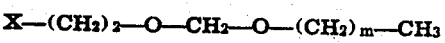

wherein X is halogen and m is selected from the group consisting of zero and integers, in the presence of sodamide, and subjecting the condensation product to mild hydrolysis under acid conditions.

FRANZ BERGEL.
NATHAN CHADWICK HINDLEY.
ALEXANDER LANG MORRISON.
HEINRICH RINDERKNECHT.